US008006121B1

(12) United States Patent
Samoilova et al.

(10) Patent No.: US 8,006,121 B1
(45) Date of Patent: Aug. 23, 2011

(54) SYSTEMS AND METHODS FOR DIAGNOSING AND FIXING ELECTRONIC DEVICES

(75) Inventors: Svetlana Samoilova, Alameda, CA (US); Wing Law, Cupertino, CA (US); Andrew Bert Hodge, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 422 days.

(21) Appl. No.: 12/217,004

(22) Filed: Jun. 30, 2008

Related U.S. Application Data

(60) Provisional application No. 60/937,865, filed on Jun. 28, 2007.

(51) Int. Cl.
*G06F 11/00* (2006.01)
(52) U.S. Cl. .............................. 714/2; 714/47
(58) Field of Classification Search .............. 714/2; 702/179–187; 455/425
See application file for complete search history.

(56) References Cited

U.S. PATENT DOCUMENTS

| | | | | |
|---|---|---|---|---|
| 5,678,002 A * | 10/1997 | Fawcett et al. | ................ | 715/709 |
| 6,247,149 B1 * | 6/2001 | Falls et al. | ................ | 714/45 |
| 6,343,236 B1 * | 1/2002 | Gibson et al. | ................ | 700/79 |
| 6,438,711 B2 * | 8/2002 | Woodruff | ................ | 714/27 |
| 6,600,614 B2 * | 7/2003 | Lenny et al. | ................ | 360/31 |
| 6,601,190 B1 * | 7/2003 | Meyer et al. | ................ | 714/37 |
| 6,983,268 B2 * | 1/2006 | Seki et al. | ................ | 1/1 |
| 6,993,537 B2 * | 1/2006 | Buxton et al. | ................ | 1/1 |
| 7,100,085 B2 * | 8/2006 | Miller | ................ | 714/26 |
| 7,124,326 B1 * | 10/2006 | Niikawa | ................ | 714/37 |
| 7,216,056 B2 * | 5/2007 | Kubota et al. | ................ | 702/179 |
| 7,260,597 B1 * | 8/2007 | Hofrichter et al. | ................ | 709/200 |
| 7,284,153 B2 * | 10/2007 | Okbay et al. | ................ | 714/30 |
| 7,313,728 B2 * | 12/2007 | Rhea et al. | ................ | 714/25 |
| 7,334,028 B2 * | 2/2008 | Flocken | ................ | 709/223 |
| 7,334,166 B1 * | 2/2008 | Rhea et al. | ................ | 714/46 |
| 7,373,553 B2 * | 5/2008 | Tripp et al. | ................ | 714/37 |
| 7,380,172 B2 * | 5/2008 | Srinivas et al. | ................ | 714/38 |
| 7,523,340 B2 * | 4/2009 | Muthukumarasamy et al. | . | 714/2 |
| 7,694,188 B2 * | 4/2010 | Raghuraman et al. | ................ | 714/47 |
| 7,721,152 B1 * | 5/2010 | Joshi et al. | ................ | 714/25 |
| 7,760,857 B2 * | 7/2010 | Vetter et al. | ................ | 379/9.03 |
| 7,761,746 B1 * | 7/2010 | Shafer et al. | ................ | 714/48 |
| 7,853,453 B2 * | 12/2010 | Potter | ................ | 704/270.1 |
| 7,853,829 B2 * | 12/2010 | Younger et al. | ................ | 714/37 |
| 2003/0032426 A1 * | 2/2003 | Gilbert et al. | ................ | 455/427 |
| 2003/0226059 A1 * | 12/2003 | Braun | ................ | 714/20 |
| 2004/0236610 A1 * | 11/2004 | Nagaoka et al. | ................ | 705/3 |
| 2005/0138471 A1 * | 6/2005 | Okbay et al. | ................ | 714/25 |
| 2006/0085667 A1 * | 4/2006 | Kubota et al. | ................ | 714/4 |
| 2007/0005202 A1 * | 1/2007 | Breed | ................ | 701/29 |
| 2007/0207800 A1 * | 9/2007 | Daley et al. | ................ | 455/425 |
| 2007/0277061 A1 * | 11/2007 | Ashe | ................ | 714/57 |
| 2008/0109675 A1 * | 5/2008 | Deng et al. | ................ | 714/2 |
| 2009/0217078 A1 * | 8/2009 | Cassett et al. | ................ | 714/2 |

* cited by examiner

*Primary Examiner* — Amine Riad
(74) *Attorney, Agent, or Firm* — Kramer Levin Naftalis & Frankel LLP

(57) ABSTRACT

Systems and methods for reducing the cost and time required for diagnosing and fixing electronic devices are provided. A host electronic device may be configured to generate a log of events that it experiences. A help component may access the generated log and analyze the log to detect if the host device has experienced a problem. Data may then be exchanged between the help component and the host device in order to fix the detected problem.

63 Claims, 2 Drawing Sheets

SYSTEMS AND METHODS FOR DIAGNOSING AND FIXING ELECTRONIC DEVICES

CROSS-REFERENCE TO RELATED APPLICATION

This claims the benefit of U.S. Provisional Application No. 60/937,865, filed Jun. 28, 2007, which is hereby incorporated by reference herein in its entirety.

FIELD OF THE INVENTION

This can relate to systems and methods for diagnosing and fixing electronic devices, and, more particularly, to systems and methods for diagnosing and fixing electronic devices through online or software based services.

BACKGROUND OF THE DISCLOSURE

When an electronic device (e.g., a media player or a portable telephone) becomes corrupted (e.g., when a device's hardware, software, or stored data fails to function properly), a user is usually unable to determine, let alone fix, the problem his or herself. Conventionally, the user has to call a technical support helpline in order to try and explain to a technician what the problem may be. Usually, this is insufficient to allow the technician to discover what is wrong with the device, and the user has to go so far as to send the device back to the manufacturer for correction or total replacement of the device. These conventional options for attempting to resolve corruption suffered by an electronic device are time consuming and expensive for both the user and manufacturer.

Accordingly, what is needed are systems and methods for reducing the cost and time required for diagnosing and fixing various electronic devices.

SUMMARY OF THE DISCLOSURE

Systems and methods for diagnosing and fixing various electronic devices are provided.

According to a particular embodiment of the invention, a method of diagnosing a host electronic device with a help component is provided. The method includes accessing at least a portion of a log with the help component, analyzing the at least a portion of the log with the help component to detect a problem experienced by the host electronic device, and exchanging corrective data between the help component and the host electronic device to fix the problem.

According to another particular embodiment of the invention, a help component is provided that includes circuitry configured to access at least a portion of a log, circuitry configured to analyze the at least a portion of the log to detect a problem, and circuitry configured to exchange corrective data to fix the problem.

According to yet another particular embodiment of the invention, an electronic device is provided that includes a program configured to generate a log of one or more events experienced by the host electronic device. The electronic device is also configured to upload the log to a help component for diagnosis.

BRIEF DESCRIPTION OF THE DRAWINGS

The above and other features of the invention, its nature, and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Methods and systems for diagnosing and fixing various electronic devices are provided and described with reference to FIGS. 1-3.

The term "electronic device" can include, but is not limited to, music players, video players, still image players, game players, other portable or non-portable media players, music recorders, video recorders, cameras, other media recorders, radios, medical equipment, calculators, cellular telephones, other wireless communication devices, personal digital assistants, programmable remote controls, pagers, laptop computers, printers, or combinations thereof. In some cases, the electronic devices may perform a single function (e.g., a device dedicated to playing music) and, in other cases, the electronic devices may perform multiple functions (e.g., a device that plays music, displays video, stores pictures, and receives and transmits telephone calls).

In any case, these electronic devices are generally any portable, mobile, hand-held, or miniature electronic device constructed in accordance with the invention so as to allow a user to listen to music, play games, record videos, take pictures, and/or conduct telephone calls wherever the user travels. Miniature electronic devices may have a form factor that is smaller than that of hand-held electronic devices, such as an iPod™ available by Apple Inc. of Cupertino, Calif. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or combination's thereof. Alternatively, electronic devices of the invention may not be portable at all.

An electronic device of the invention can include at least one input component that allows a user to manipulate a function of the device, at least one output component that provides the user with valuable device generated information, and a protective housing that at least partially encloses the one or more input and output components of the device.

Figure 1:
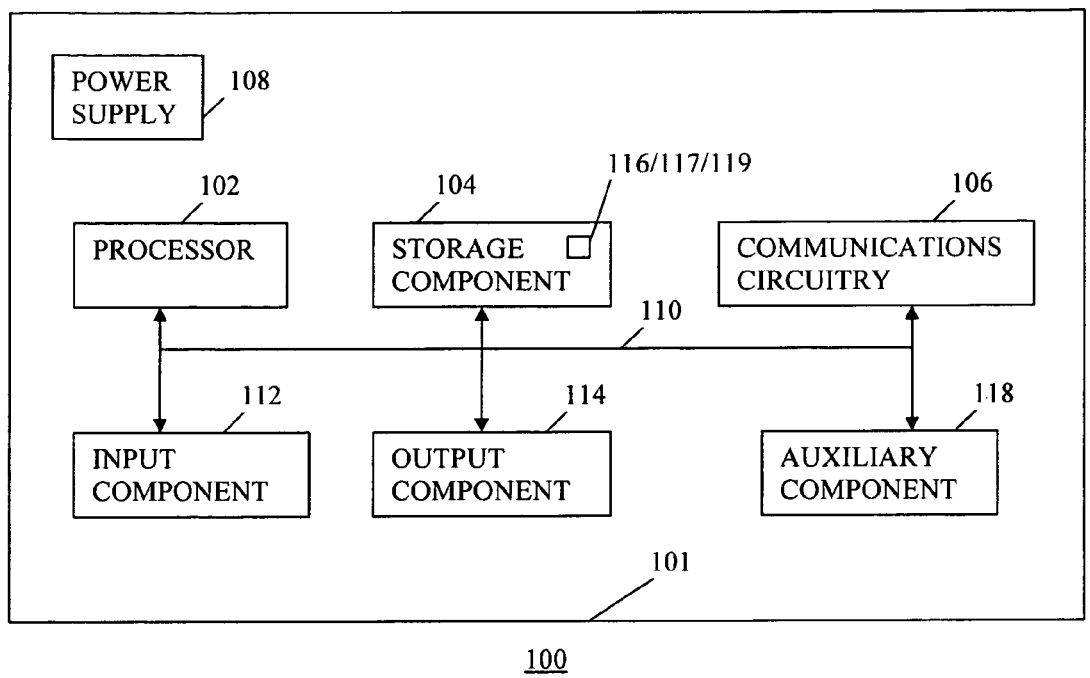
FIG. 1 is a simplified block diagram of an electronic device in accordance with an embodiment of the invention.

For example, FIG. 1 illustrates a simplified block diagram of an illustrative electronic device 100 in accordance with one embodiment of the invention. As shown in FIG. 1, for example, electronic device 100 can include at least one user input component 112 that may be of a variety of forms including, but not limited to, a depressible switch, a sliding switch, a keypad, a dial, a scroll wheel, a touch screen display, a trackball, a joystick, a touch pad, electronics for accepting audio and/or visual information, an antenna, an infrared port, or a combination thereof. Furthermore, in certain embodiments, each one of the one or more input components 112 of device 100 can be configured to provide one or more dedicated control functions for making selections or issuing commands associated with operating the device. By way of example, in the case of a music file player, the function of an input component can be associated with powering up or down the device, opening or closing a menu, playing or stopping a song, changing a mode, and the like.

As mentioned above, an electronic device can also include at least one output component that provides the user with valuable device generated information. For example, electronic device 100 can include at least one output component 114 that may be of a variety of forms including, but not limited to, an audio speaker, headphones, an audio line-out, a visual display, an antenna, an infrared port, or a combination thereof. In some embodiments, input component 112 and output component 114 may be a single or shared component, such as a touch screen display.

The housing of an electronic device (e.g., housing 101 of device 100) can also include a processor, a storage component, communications circuitry, a bus, and a power supply for powering the device. For example, as shown in FIG. 1, a bus 110 of electronic device 100 can provide a data transfer path for transferring data, to, from, or between at least a processor 102, a storage component 104, communications circuitry 106, input component 112, output component 114, and an auxiliary component 118. In some embodiments, device 100 can include more than one of each of these elements, but for the sake of illustration, only one of each is shown in FIG. 1.

Processor or control circuitry 102 of device 100 can control the operation of many functions and other circuitry included in the device. For example, processor 102 can receive user inputs from input component 112 and can drive output component 114.

Storage component 104 can include one or more storage mediums, including, for example, a hard-drive, flash memory, permanent memory such as read-only memory ("ROM), semi-permanent memory such as random access memory ("RAM"), any other suitable type of storage component, or any combination thereof. Storage component 104 can include cache memory, which may be one or more different types of memory used for temporarily storing data for electronic device applications. Storage component 104 may store media (e.g., music and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps tracks of podcasts or television shows or other media a user subscribes to), contacts information (e.g., telephone numbers and email address), calendar information, any other suitable data, or any combination thereof.

In some embodiments, storage component 104 may store authentication information for a user to enter prior to accessing the functionality of device 100. For example, storage component 104 may store username and password combinations, or algorithms and keys for authenticating a string entered by the user (e.g., using an RSA algorithm). Storage component 104 may store data for pairing itself or communicating with one or more devices (e.g., help component 300 of FIG. 2, as described in more detail below) using a short-range communications protocol.

Communications circuitry 106 of electronic device 100 can include circuitry for permitting wireless communication (e.g., short-range and/or long-range communication) with one or more servers (e.g., help component 300 of FIG. 2) using any suitable communications protocol. For example, communications circuitry 106 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 can also include circuitry that enables device 100 to be electrically coupled to another device (e.g., a computer or an accessory device, such as an FM transmitter) and communicate with that other device.

Furthermore, additional electrical components, such as an auxiliary component 118, can be provided by electronic device 100 according to some embodiments of the invention. For example, auxiliary component 118 may be any component provided for sending and/or receiving media, including, but not limited to, microphones, amplifiers, digital signal processors ("DSPs"), image sensors (e.g., charge coupled devices ("CCDs")) or optics (e.g., lenses, splitters, filters, etc.), antennas, receivers, transmitters, transceivers, and the like.

Alternatively or additionally, auxiliary component 118 may include one or more environmental sensors, circuitries, and/or software or firmware applications for detecting the position, orientation, movement, or other environmental-based event information or environmental conditions of electronic device 100. Such sensors and circuitries may include, but are not limited to, one or more single-axis or multi-axis accelerometers, angular rate or inertial sensors (e.g., optical gyroscopes, vibrating gyroscopes, gas rate gyroscopes, or ring gyroscopes), magnetometers (e.g., scalar or vector magnetometers), light sensors, temperature sensors, pressure sensors, infrared ("IR") sensors, linear velocity sensors, thermal sensors, fluid sensors (e.g., moisture and liquid sensors), microphones, ambient light sensors ("ALS"), proximity sensors, capacitive proximity sensors, acoustic sensors, sonic or sonar sensors, radar sensors, image sensors, video sensors, global positioning system ("GPS") detectors, radio frequency ("RF") detectors, RF or acoustic doppler detectors, RF triangulation detectors, electrical charge sensors (e.g., battery charge status sensors to determine power consumption and power availability), peripheral device detectors, event counters, and/or combinations thereof. For example, device 100 may be configured to read data from one or more of the sensors or circuitries in auxiliary component 118 in order to determine the orientation or velocity of electronic device 100, and/or the amount or type of light, heat, or sound that device 100 is being exposed to, and the like.

Moreover, alternatively or additionally, auxiliary component 118 may include one or more usage sensors, circuitries, and/or software or firmware applications, such as an event counter that may count the number of times that an event has occurred, has not occurred, or should have occurred with respect to the device, or any other usage-based event information or usage conditions of electronic device 100. For example, if device 100 is a telephone or electronic messaging device, a usage counter may detect if a user fails to answer a telephone call after several alert instances, or if a user has received a certain amount of e-mails from a certain party within a certain period of time. Therefore, electronic device 100 may be configured to detect when device 100 has been used in a certain way. A usage sensor of auxiliary component 118 may also include, for example, a signal strength detector (e.g., a battery charging sensor to determine how much capacity of battery (e.g., battery 108) is remaining or a light strength sensor to determine how bright a graphic display of device 100 is able to shine).

A power supply 108 can provide power to the components of device 100. In some embodiments, power supply 108 can be coupled to a power grid (e.g., a personal computer). In some embodiments, power supply 108 can include one or more batteries for providing power in a portable device. As another example, power supply 108 can be configured to generate power in a portable device from a natural source (e.g., solar power using solar cells).

As described above, a disadvantage of conventional electronic devices is that the options for attempting to resolve corruption suffered by such devices are time consuming and expensive for both the users and manufacturers of the devices. Therefore, according to certain embodiments of the invention, an electronic device may be provided with an application or firmware or any other type of program that can collect useful information related to how the device is used. For example, the application or firmware of the invention may be provided in storage device 104 of electronic device 100 (see, e.g., log or breadcrumb program 116).

In some embodiments, program 116 may create and save a historical log(e.g., log 117) of all or at least certain types of events experienced by the device, including any action taken by any hardware component of device 100 and any response taken by any software or firmware of device 100, such as crash events, program update events (e.g., software update events or firmware update events), media or other file type transfer events (e.g., file download events or file upload events), environmental events, and usage events, for example. The types of information related to each event that historical log 117 may store can include, but is not limited to, the date (e.g., time, calendar day, etc.) that the event occurred, the duration of the event, the physical conditions or surroundings of the device during the event (e.g., shock events if the device had been dropped as detected by an accelerometer, moisture levels if the device had been exposed to damaging liquids, etc.), the location of the device during the event, the versions of software and firmware stored on or being used by the device during the event, identification of hardware used by the device during the event (e.g., chip maker's identification), any errors that occurred during the event, the size of any data received by or transmitted from the device during the event, the success of any reception or transmission of data by the device during the event, the strength of any signals being received by or transmitted from the device during the event, and the types of other events that occurred before and/or after the event (e.g., detected errors in a storage medium of the device). In some embodiments, log 117 may store data that can identify the one or more servers, accessories, and/or other devices that its device may have communicated with during the event (e.g., accessory device 150 and/or help component 300 of FIG. 2).

In some embodiments, program 116 may be configured to recognize or detect corruption of device 100 or an accessory coupled to device 100 (e.g., accessory device 150 of FIG. 2) during its use by analyzing historical log 117. For example, program 116 may be configured to analyze historical log 117 to recognize or detect corruption of media, a file system, a database, a file structure, or the like of device 100 or an accessory coupled to device 100. This may be accomplished by heuristically analyzing log 117, for example. In some embodiments, program 116 may create a flag or key 119 indicative of just the existence of the detected corruption or of some specifics about the type of corruption detected. For example, key 119 may be an intelligent extraction of information from log 117 that can trigger immediate action when accessed for diagnostic or corrective purposes. Key 119 may be able to extract necessary information from log 117 for helping to diagnose device 100 while protecting a user's private information or other particular details that may be stored in log 117 from being seen or accessed by another entity. Key 119 may be a summary of log 117 that may be useful to and accessible by an entity for diagnosing or fixing device 100 (e.g., help component 300 as described below in more detail). Key 119 may be generated by extracting information from log 117 in an abstract way and/or by using checksums, for example.

The historical log and/or key created by a program to collect useful information related to how an electronic device is used (e.g., log 117 and/or key 119 created by program 116 of device 100) can be provided on any device capable of downloading data from and/or uploading data to another device or server. For example, a "host" device with such a program may be capable of communicating with another device wirelessly or via one or more wires. Additionally or alternatively, the "host" device with such a program may be capable of communicating with a server wirelessly or via one or more wires. If the host device becomes corrupted, the program or at least the log or key of the host device may be used by the other device or server to diagnose and even fix the host device.

Figure 2:
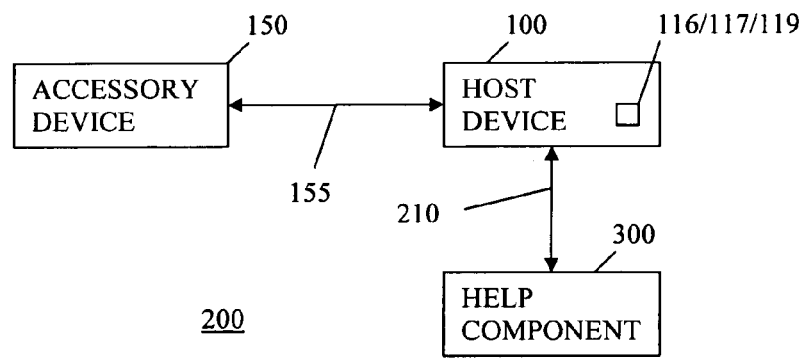
FIG. 2 is an exemplary network system that includes the electronic device of FIG. 1 in accordance with an embodiment of the invention.

FIG. 2 illustrates a schematic view of an illustrative data system in accordance with an embodiment of the invention. Data system 200 can include host electronic device 100 with program 116 and log 117, as described above, as well as a "help" electronic device or "help" server 300. Moreover, in some embodiments, system 200 can also include one or more accessory devices 150 coupled to host device 100 via an accessory communications link 155. In some embodiments, data system 200 may include several help electronic devices/servers or help components 300, several host devices 100, and/or several accessory devices 150. However, to avoid overcomplicating the drawing, only one host device 100, only one accessory device 150, and only one help component 300 are shown in FIG. 2.

Accessory device 150 may be any device that can be coupled to and used in conjunction with electronic device 100, such as, but not limited to, audio speakers, headphones, a video display, microphone, power charger/docking device, or combinations thereof. Accessory device 150 may enhance the functionality, convenience, or aesthetics of electronic device 100. For example, accessory device 150 may be a wireless Bluetooth™ headset for electronic device 100 that may be provided as a cellular telephone. A wireless Bluetooth™ headset may enhance the use of a cellular telephone by allowing users to have a hands-free, wireless conversation through their cellular telephone. Similarly, a docking accessory device may be an accessory to a portable media player, where the docking device is used to update and provide power to the portable media player.

Electronic device 100 and accessory device 150 may communicate over accessory communications link 155, which may include any suitable wired or wireless communications link, or combinations thereof, by which data may be exchanged between device 100 and device 150. For example, accessory link 155 may include, but is not limited to, a Bluetooth™ link, a fiber-optic link, a cable link, a cellular network link, or any other suitable wired or wireless link.

Accessory link 155 may transmit data using any suitable communications protocol supported by the medium of accessory link 155. Such communications protocols may include, for example, Wi-Fi™, Ethernet, Bluetooth™, high frequency systems (e.g., 900 MHz, 2.4 GHz, and 5.6 GHz communication systems), infrared, TCP/IP, HTTP, BitTorrent™, FTP, RTP, RTSP, SSH, any other communications protocol, or any combination thereof.

Help component 300 can store data files that host device 100 may want to access. Help component 300 can additionally or alternatively include applications that help component 300 may use to access and inspect program 116 and/or log 117 of host device 100. To affect these and other types of data exchange, host device 100 can issue a data exchange request to help component 300 in some embodiments, and help component 300 can issue a data exchange request to host device 100 in some embodiments. Responsive thereto, one of the host device and help component can locate and then exchange the requested data with the other of the host device and help component.

In some embodiments, host device 100 may issue a data exchange request with help component 300 once program 116 updates log 117 in a particular way or once host device 100 experiences a particular type of "instigating" event (e.g., after each update of log 117, after an update of log 117 related to a specific environmental or usage event experienced by device 100, etc.). Therefore, host device 100 may issue a data exchange request with help component 300 such that help component 300 may access log 117 after a particular type of update has been made to log 117, for example. In some embodiments, host device 100 may issue a data exchange request with help component 300 whenever host device 100 detects a network (e.g., a cellular network or Wi-Fi™ network) that help component 300 may be in. In other embodiments, help component 300 may issue a data exchange request with host device 100 whenever a user of host device 100 manually establishes a connection between host device 100 and help component 300 (e.g., when communications circuitry 106 of host device 100 has been corrupted or is otherwise not functioning, such that the wireless communication capabilities of host device 100 are compromised, and the user physically couples host device 100 to help component 300 via a wire or cable), for example.

Device 100 and component 300 may communicate over a communications link 210. Communications link 210 may include any suitable wired or wireless communications link, or combinations thereof, by which data may be exchanged between device 100 and component 300. For example, communications link 210 may include, but is not limited to, a satellite link, a fiber-optic link, a cable link, an Internet link, a cellular network link, or any other suitable wired or wireless link.

Communications link 210 may transmit data using any suitable communications protocol supported by the medium of communications link 210. Such communications protocols may include, for example, Wi-Fi™, Ethernet, Bluetooth™, high frequency systems (e.g., 900 MHz, 2.4 GHz, and 5.6 GHz communication systems), infrared, TCP/IP, HTTP, BitTorrent™, FTP, RTP, RTSP, SSH, any other communications protocol, or any combination thereof.

Help component 300 can be any device similar to host device 100. Help component 300 can include any suitable server or other electronic device for receiving data from and/or providing data to host device 100. For example, component 300 can include a file server, a database server, a web server, a file transfer protocol ("FTP") server, a virtual private network ("VPN") server, a proxy server, or any other server operative to communicate with host device 100. In some embodiments, component 300 can include a media server operative to provide media to host device 100 (e.g., iTunes™ available by Apple Inc. of Cupertino, Calif.). In such an embodiment, every time a user connects host device 100 with help component 300 (e.g., iTunes™) for communicating media or other data therebetween, help component 300 may automatically, or at the user's approval, access at least a portion of log 116 from host device 100.

In some embodiments, help component 300, like host device 100, can be any electronic device operative to communicate with a server or other device. For example, host device 100 and help component 300 may each be a portable media player (e.g., an iPod™ available by Apple Inc.), a cellular telephone (e.g., an iPhone™ available by Apple Inc.), a pocket-sized personal computer (e.g., an iPAQ Pocket PC™ available by Hewlett Packard Inc. of Palo Alto, Calif.), a personal digital assistant, a personal computer (e.g., a desktop computer, such as an iMac™ available by Apple Inc., or a laptop computer, such as a MacBook™ available by Apple Inc.), and any other device capable of communicating via wires or wirelessly (with or without the aid of a wireless enabling accessory system).

In some embodiments, whether or not host electronic device 100 or accessory device 150 is corrupted, historical log 117 and/or key 119 created by program 116 may be communicated from host device 100 to help component 300 via communications link 210. In some embodiments, help component 300 may be configured to access historical log 117 from program 116 of host device 100. Help component 300 may be configured to recognize or detect corruption of device 100 or corruption of accessory device 150 coupled to device 100 during its use by analyzing historical log 117 accessed from host device 100. For example, help component 300 may be configured to analyze historical log 117 to recognize or detect one or more problems experienced by host device 100 or associated accessory device 150, such as corruption of media, a file system, a database, a file structure, software, hardware, firmware, or the like of device 100 or of accessory 150, including storage system failures, power system failures, network system failures, and accessory device failures. Help component 300 may accomplish this by heuristically analyzing log 117, for example.

Log 117 may be generated periodically (e.g., every 5 milliseconds, every 30 minutes, every 5 hours, after every reset, or at any other time based or event based or environment based event occurs). Each generated log 117 may be stored on device 100 or uploaded to a remote entity, and each log 117 may be retained or overwritten by a more recently generated log 117 depending on available storage space and/or processing capabilities, for example.

Additionally or alternatively, in some embodiments, program 116 may create key 119 indicative of the corruption detected, as described above. Help component 300 may be configured to access key 119 created by program 116 of host device 100. Help component 300 may be configured to recognize or detect corruption of device 100 or accessory 150 coupled to device 100 during its use by receiving key 119 accessed from device 100. Once a key 119 is generated using a particular log 117, that key 119 may be stored on device 100 or uploaded to a remote entity, while the particular log 117 may be deleted in some embodiments or too may be stored on device 100 or uploaded to a remote entity.

Host device 100 and/or help component 300 may simply detect that host device 100 or associated accessory 150 is corrupted. However, in other embodiments, host device 100 and/or help component 300 may be able to detect the type of corruption that host device 100 or accessory 150 has suffered.

When help component 300 detects that host device 100 is corrupted, help component 300 may reset or restore host device 100 (e.g., to its factory settings). Help component 300 may do this either automatically or at the option of the user of host device 100, for example. This reset or restore may be done by uploading certain data to host device 100 from help component 300 and/or removing or deleting certain data from host device 100 (e.g., using communications link 210). When help component 300 detects that host device 100 has a particular type of corruption, help component 300 may fix that particular corruption (e.g., without resetting the device or erasing media from the device). Help component 300 may do this either automatically or at the option of the user of host device 100, for example. This fix may be done by uploading certain data (e.g., customized data based on the particular corruption detected) to host device 100 from help component 300 and/or removing or deleting certain data from host device 100. All of this may be done transparently to the user of device 100.

Help component 300 may tap into redundant hardware or use other hardware of host device 100 to replace whatever portion of device 100 was determined to be corrupted (e.g., portions of flash memory). Help component 300, in conjunction with program 116 in some embodiments, may scan device 100 and determine where the corruption or source of the corruption exists. Help component 300 may then bypass those one or more portions of device 100 and utilize other portions of device 100 to fix or reset device 100.

Figure 3:
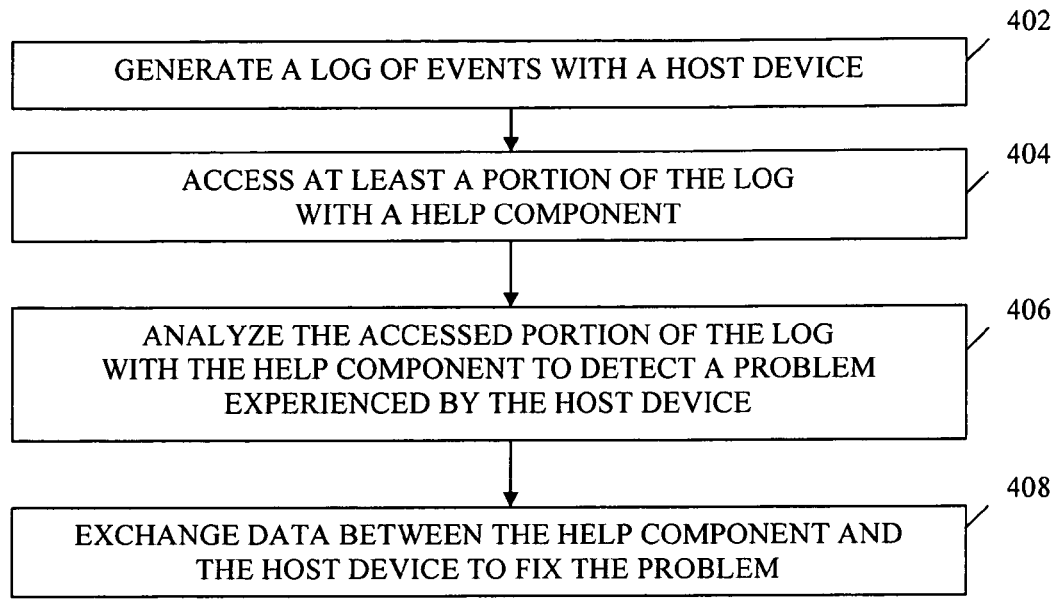
FIG. 3 is an illustrative flowchart showing various steps of a process for diagnosing and fixing an electronic device in accordance with an embodiment of the invention.

FIG. 3 shows a flowchart of an illustrative process for diagnosing and fixing an electronic device in accordance with the invention. Process 400 of FIG. 3 may begin with a host electronic device generating a log of events experienced by the device at step 402. These events may include any action taken by any hardware component of the host device or an associated accessory device and any response taken by any software or firmware of the host device or the accessory device, such as crash events, software update events, media download events, environmental events, and usage events, for example.

At step 404, a help component may access at least a portion of the log generated by the host device (e.g., the log itself, a portion thereof, or a key generated from the log). The host device and the help component may communicate over a communications link such that the help component can access the log. The communications link may include any suitable wired or wireless communications link, or combinations thereof, by which data may be exchanged between the host device and the help component. For example, the communications link may include, but is not limited to, a satellite link, a fiber-optic link, a cable link, an Internet link, a cellular network link, or any other suitable wired or wireless link. The communications link may transmit data using any suitable communications protocol, such as Wi-Fi™, Ethernet, Bluetooth™, high frequency systems (e.g., 900 MHz, 2.4 GHz, and 5.6 GHz communication systems), infrared, TCP/IP, HTTP, BitTorrent™, FTP, RTP, RTSP, SSH, any other communications protocol, or any combination thereof.

At step 406, the help component may analyze the accessed portion of the log to detect a problem experienced by the host device. In some embodiments, the help component may be configured to access at least a portion of the log of the host device and may be configured to analyze the log to recognize or detect whether the host device or an associated accessory device has experienced a corruption or problem or is in need of a software or firmware update. For example, the help component may be configured to analyze the log to recognize or detect corruption of media, a file system, a database, a file structure, or the like of the host device or of an accessory device associated with the host device. In some embodiments, the help component may only be able to detect that the host device or an associated accessory device has been corrupted by a problem. However, in other embodiments, the help component may be able to detect the particular type of corruption that the host device or associated accessory device has suffered.

The help component may accomplish this by heuristically analyzing the accessed portion of the log, for example. In other embodiments, the help component may compare the accessed portion of the log with a database of data that may have been previously accumulated by the help component or by various other instruments, and from the host device or from various other devices, in order to determine whether the host device or an associated accessory device has experienced a corruption or other problem. In yet other embodiments, a user or some administrator associated with the help component may at least partially manually review the accessed log of the host device in order to determine whether the host device or an associated accessory device has experienced a corruption or problem. In some embodiments, the help component may transmit a particular type of signal to the host device and then analyze what signal was actually received by the host device as compared to the signal actually sent in order to detect certain problems with the host device.

Next, at step 408, data may be exchanged between the host device and the help component to fix the detected problem. For example, when the help component detects that the host device or an associated accessory device is corrupted or has any other type of problem, the help component may reset or restore the host device or the accessory (e.g., to its factory settings). This reset or restore may be done by uploading certain corrective data to the host device from the help component and/or by removing or deleting certain corrective data from the host device. When the help component detects that the host device has a particular type of corruption, the help component may fix that particular corruption (e.g., without resetting the host device or erasing data from the host device) by uploading certain data (e.g., customized data based on the particular corruption detected) to the host device from the help component and/or removing or deleting certain data from the host device. The exchanged data that is removed from the host device and/or communicated between the host device and the help device may be determined by the help device or an agent of the help device (e.g., a human administrator) based on the problem detected at step 406.

All of this may be done transparently to a user of the host device. Alternatively, in some embodiments, the help component may provide instructions to a user of the host device at one or more of steps 404, 406, and 408 in order to better service the host device. For example, after detecting that the host device has experienced a problem at step 406, the help component may communicate to a user of the host device one or more instructions on how the user should interact with the host device in a certain way in order to fix the problem at step 408. Such an instruction may include instructing the user to press one or more mechanical buttons of the host device in a certain fashion, for example. Alternatively or additionally, such an instruction may include instructing the user on how to more efficiently and effectively to use the host device in order to potentially avoid problems in the future (e.g., to replace an associated accessory device, actively scan media or storage, update firmware or software more often, charge the device's battery in a new way, switch between certain modes of the device during certain situations, etc.), for example.

While there have been described systems and methods for reducing the cost and time required for diagnosing and fixing electronic devices, it is to be understood that many changes may be made therein without departing from the spirit and scope of the invention. It is also to be understood that the steps shown in the flowchart discussed above are merely illustrative and that existing steps may be modified, added, or omitted. Those skilled in the art will appreciate that the invention can be practiced by other than the described embodiments, which are presented for purposes of illustration rather than of limitation, and the invention is limited only by the claims which follow.

What is claimed is:

1. A method of diagnosing a host electronic device with a help component, the method comprising:
   accessing at least a portion of a log with the help component;
   analyzing the at least a portion of the log with the help component to detect a problem experienced by the host electronic device;
   exchanging corrective data between the help component and the host electronic device to fix the problem, wherein the exchanging includes uploading the corrective data to the host electronic device from the help component; and
   in response to the host electronic device receiving the corrective data, scanning the host electronic device with the host electronic device to determine a portion of the host electronic device that experienced the problem.

2. The method of claim 1 further comprising generating the log with the host electronic device based on one or more events experienced by the host electronic device, wherein at least a first event of the one or more events is a crash event.

3. The method of claim 1 further comprising generating the log with the host electronic device based on one or more events experienced by the host electronic device, wherein at least a first event of the one or more events is a program update event.

4. The method of claim 1 further comprising generating the log with the host electronic device based on one or more events experienced by the host electronic device, wherein at least a first event of the one or more events is a file transfer event.

5. The method of claim 1 further comprising generating the log with the host electronic device based on one or more events experienced by the host electronic device, wherein at least a first event of the one or more events is an environmental event.

6. The method of claim 1 further comprising generating the log with the host electronic device based on one or more events experienced by the host electronic device, wherein at least a first event of the one or more events is a usage event.

7. The method of claim 1 further comprising generating the log with the host electronic device based on one or more events experienced by the host electronic device, wherein the generating the log comprises storing one or more pieces of information related to each of the one or more events.

8. The method of claim 7, wherein a first piece of the one or more pieces of information related to a first event of the one or more events is the date that the first event occurred.

9. The method of claim 7, wherein a first piece of the one or more pieces of information related to a first event of the one or more events is the duration of the first event.

10. The method of claim 7, wherein a first piece of the one or more pieces of information related to a first event of the one or more events is the location of the host electronic device during the first event.

11. The method of claim 7, wherein a first piece of the one or more pieces of information related to a first event of the one or more events is the type of error that occurred during the first event.

12. The method of claim 7, wherein a first piece of the one or more pieces of information related to a first event of the one or more events is the size of data received by the host electronic device during the first event.

13. The method of claim 7, wherein a first piece of the one or more pieces of information related to a first event of the one or more events is the type of data received by the host electronic device during the first event.

14. The method of claim 7, wherein a first piece of the one or more pieces of information related to a first event of the one or more events is the size of data transmitted from the host electronic device during the first event.

15. The method of claim 7, wherein a first piece of the one or more pieces of information related to a first event of the one or more events is the type of data transmitted from the host electronic device during the first event.

16. The method of claim 7, wherein a first piece of the one or more pieces of information related to a first event of the one or more events is the identity of an other entity that communicated with the host electronic device during the first event.

17. The method of claim 1, wherein the accessing includes:
   transmitting a data exchange request from the host electronic device to the help component in response to the host electronic device experiencing an instigating event; and
   in response to the help component receiving the data exchange request, downloading the at least a portion of the log from the host electronic device to the help component.

18. The method of claim 1, wherein the accessing includes transmitting the at least a portion of the log from the host electronic device to the help component using a wireless protocol.

19. The method of claim 1, wherein the analyzing is heuristic.

20. The method of claim 1, wherein the analyzing includes comparing the at least a portion of the log to a database of previously accumulated data.

21. The method of claim 1, wherein the analyzing includes studying the at least a portion of the log with a human administrator of the help component.

22. The method of claim 1, wherein the exchanging resets the host electronic device.

23. The method of claim 1, wherein the exchanging includes deleting the corrective data from the host electronic device.

24. The method of claim 1, wherein the exchanging includes communicating the corrective data to a user of the host electronic device, wherein the corrective data includes one or more instructions teaching the user how to interact with the host electronic device to fix the problem.

25. The method of claim 1, wherein the host electronic device is a portable media device.

26. The method of claim 1, wherein the host electronic device is a cellular telephone.

27. The method of claim 1, wherein the host electronic device is a personal computer.

28. The method of claim 1, wherein the help component is a web server.

29. The method of claim 1, wherein the help component is a file server.

30. The method of claim 1, wherein the help component is a portable media device.

31. The method of claim 1, wherein the help component is a cellular telephone.

32. The method of claim 1, wherein the help component is a personal computer.

33. A diagnostic system comprising:
a help component comprising:
circuitry configured to access at least a portion of a log;
circuitry configured to analyze the at least a portion of the log to detect a problem; and
circuitry configured to exchange corrective data to fix the problem; and
a host electronic device including a program configured to generate the log based on one or more events experienced by the host electronic device, wherein the help component is configured to upload the corrective data to the host electronic device to exchange the corrective data, and wherein, in response to the host electronic device receiving the uploaded corrective data, the host electronic device is configured to scan the host electronic device to determine a portion of the host electronic device that experienced the problem.

34. The system of claim 33, wherein the help component is configured to use a wireless protocol to access the at least a portion of the log.

35. The system of claim 33, wherein the help component is configured to use heuristics to analyze the at least a portion of the log.

36. The system of claim 33, wherein the help component is configured to compare the at least a portion of the log to a database of previously accumulated data to analyze the at least a portion of the log.

37. The system of claim 33, wherein the help component is configured to permit a human administrator of the help component to study the at least a portion of the log to analyze the at least a portion of the log.

38. The system of claim 33, wherein the help component is a web server.

39. The system of claim 33, wherein the help component is a file server.

40. The system of claim 33, wherein the help component is a portable media device.

41. The system of claim 33, wherein the help component is a cellular telephone.

42. The system of claim 33, wherein the help component is a personal computer.

43. The system of claim 33, wherein at least a first event of the one or more events is a crash event.

44. The system of claim 33, wherein at least a first event of the one or more events is a program update event.

45. The system of claim 33, wherein at least a first event of the one or more events is a file transfer event.

46. The system of claim 33, wherein at least a first event of the one or more events is an environmental event.

47. The system of claim 33, wherein at least a first event of the one or more events is a usage event.

48. The system of claim 33, wherein the program is configured to store one or more pieces of information related to each of the one or more events to generate the log.

49. The system of claim 48, wherein a first piece of the one or more pieces of information related to a first event of the one or more events is the date that the first event occurred.

50. The system of claim 48, wherein a first piece of the one or more pieces of information related to a first event of the one or more events is the duration of the first event.

51. The system of claim 48, wherein a first piece of the one or more pieces of information related to a first event of the one or more events is the location of the host electronic device during the first event.

52. The system of claim 48, wherein a first piece of the one or more pieces of information related to a first event of the one or more events is the type of error that occurred during the first event.

53. The system of claim 48, wherein a first piece of the one or more pieces of information related to a first event of the one or more events is the size of data received by the host electronic device during the first event.

54. The system of claim 48, wherein a first piece of the one or more pieces of information related to a first event of the one or more events is the type of data received by the host electronic device during the first event.

55. The system of claim 48, wherein a first piece of the one or more pieces of information related to a first event of the one or more events is the size of data transmitted from the host electronic device during the first event.

56. The system of claim 48, wherein a first piece of the one or more pieces of information related to a first event of the one or more events is the type of data transmitted from the host electronic device during the first event.

57. The system of claim 48, wherein a first piece of the one or more pieces of information related to a first event of the one or more events is the identity of an other entity that communicated with the host electronic device during the first event.

58. The system of claim 33, wherein the host electronic device is further configured to transmit a data exchange request to the help component in response to the host electronic device experiencing an instigating event, and wherein the help component is further configured to receive the data exchange request and to download the at least a portion of the log from the host electronic device to access the at least a portion of the log.

59. The system of claim 33, wherein the help component is configured to reset the host device to exchange the corrective data.

60. The system of claim 33, wherein the help component is configured to delete the corrective data from the host electronic device to exchange the corrective data.

61. The system of claim 33, wherein the help component is configured to communicate the corrective data to a user of the host electronic device to exchange the corrective data, and wherein the corrective data includes one or more instructions for teaching the user how to interact with the host electronic device for fixing the problem.

62. The system of claim 33, wherein the host electronic device is a portable media device.

63. The system of claim 33, wherein the host electronic device is a cellular telephone.

* * * * *